Sept. 11, 1934.　　　　W. W. KELLY　　　　1,973,347
DISPENSING DEVICE
Filed Jan. 19, 1933　　　5 Sheets-Sheet 1

Sept. 11, 1934.                W. W. KELLY                1,973,347
                            DISPENSING DEVICE
                         Filed Jan. 19, 1933          5 Sheets—Sheet 2

Inventor
W. W. Kelly
By Hull Brock & West
Attorney

Sept. 11, 1934.   W. W. KELLY   1,973,347
DISPENSING DEVICE
Filed Jan. 19, 1933    5 Sheets-Sheet 3
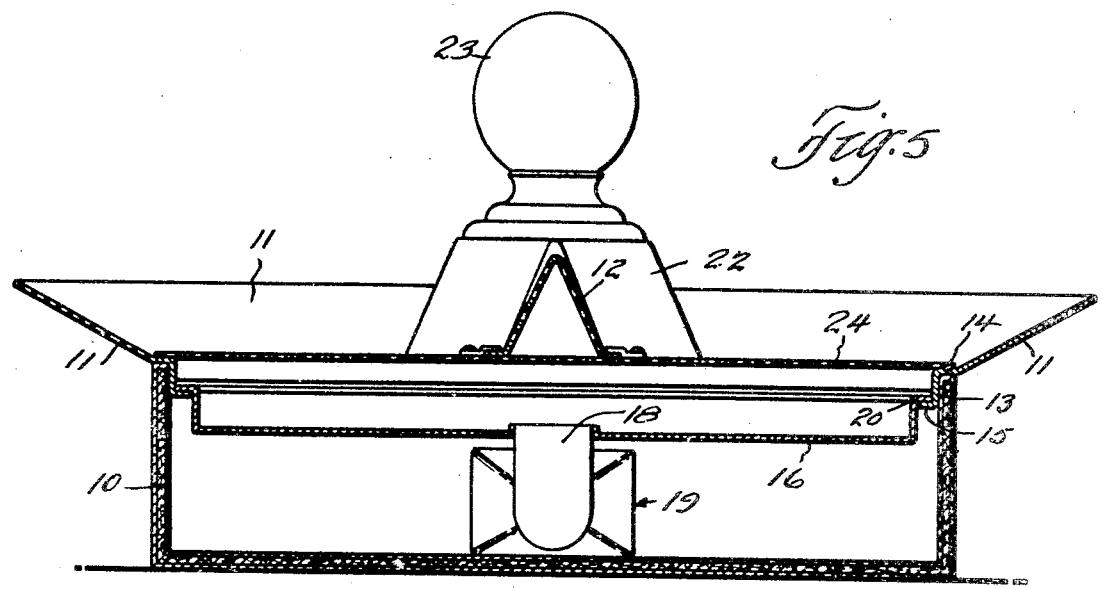
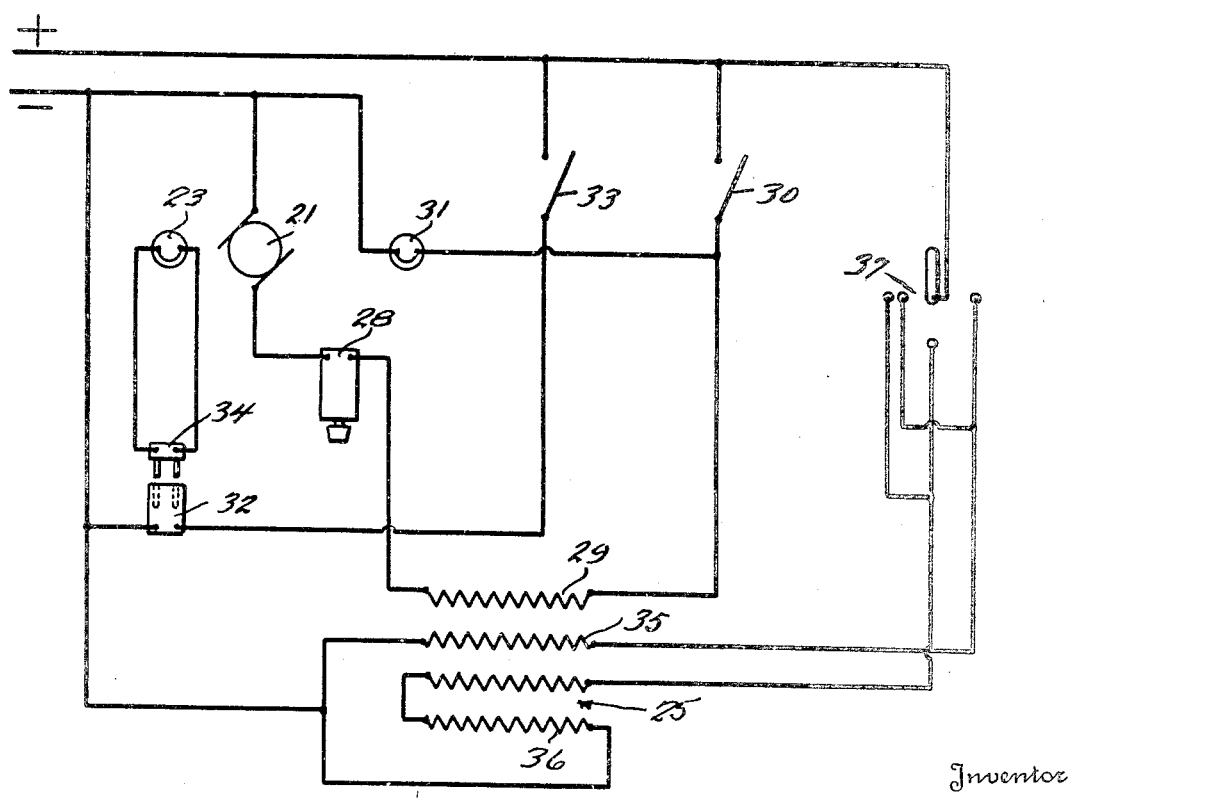
Inventor
W. W. Kelly
By Hull Brock & West
Attorney Sept. 11, 1934.  W. W. KELLY  1,973,347
DISPENSING DEVICE
Filed Jan. 19, 1933     5 Sheets-Sheet 4

Inventor
W. W. Kelly
By Hull Buck & West
Attorney

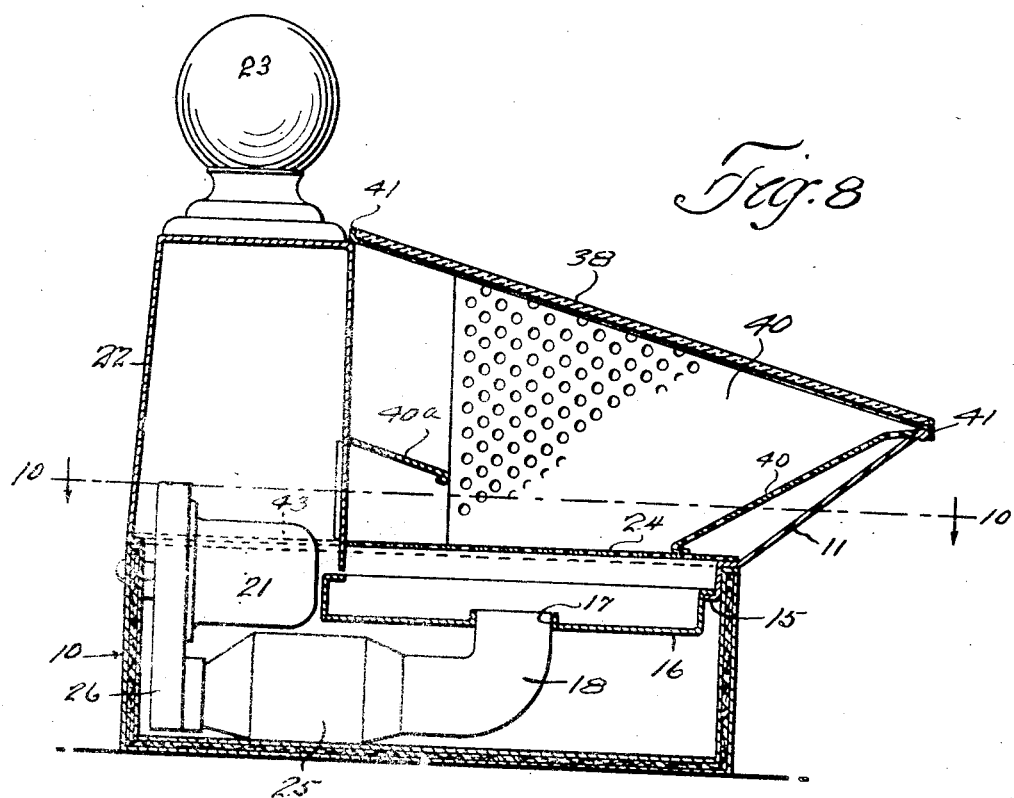
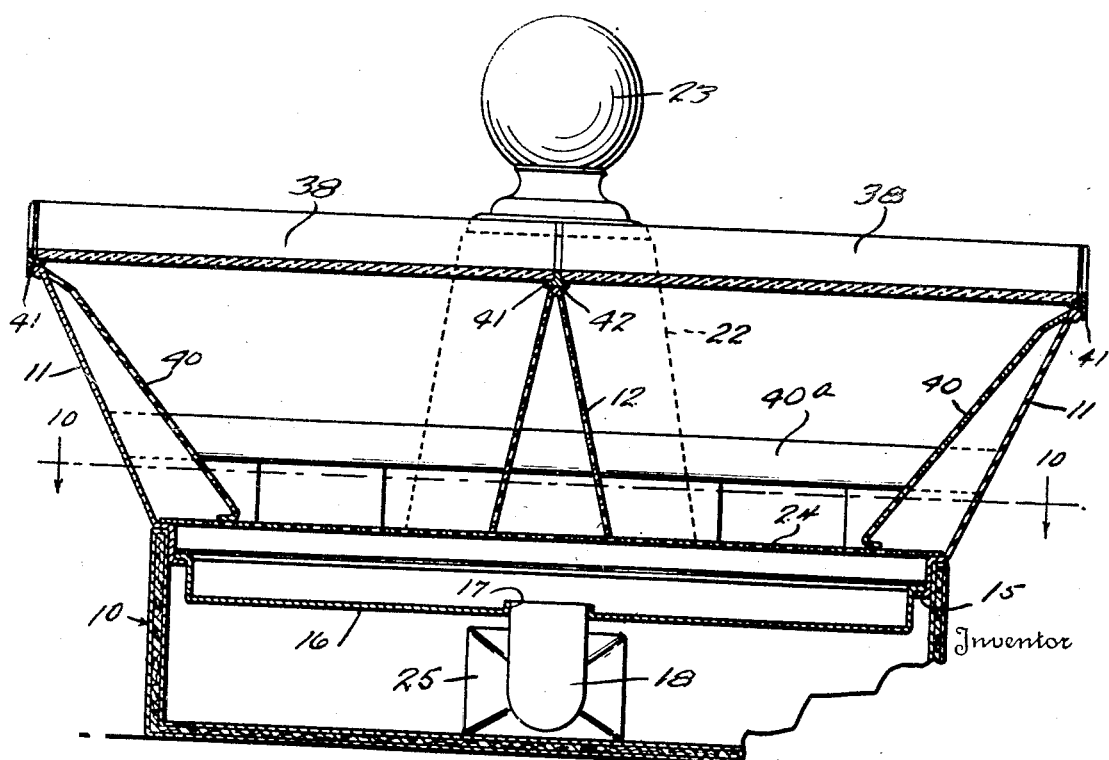

Patented Sept. 11, 1934

1,973,347

UNITED STATES PATENT OFFICE 1,973,347

DISPENSING DEVICE

William W. Kelly, Cleveland, Ohio

Application January 19, 1933, Serial No. 652,515

4 Claims. (Cl. 34—21)

This invention relates to a dispensing device designed particularly for use in the retail sale of nut meats although adaptable for use with other commodities.

The principal object of the invention is to display the nuts or like commodities effectively and at the same time maintain them in condition for immediate consumption, as well as diffusing to the surrounding atmosphere a characteristic aroma for the purpose of attracting customers.

With the foregoing and other and more limited objects in view the invention consists in the combination of elements and arrangement of parts as hereinafter specifically described and as claimed.

Figure 2:
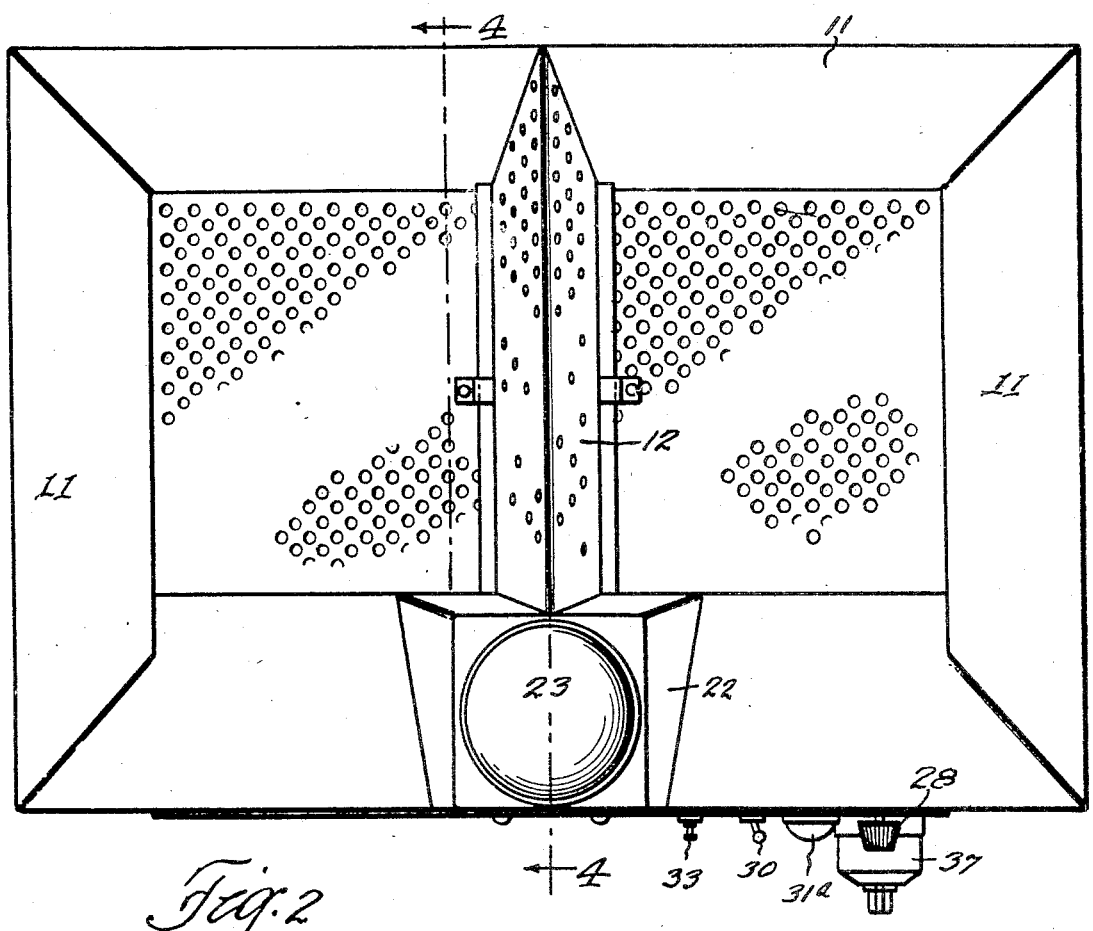
Figure 1:
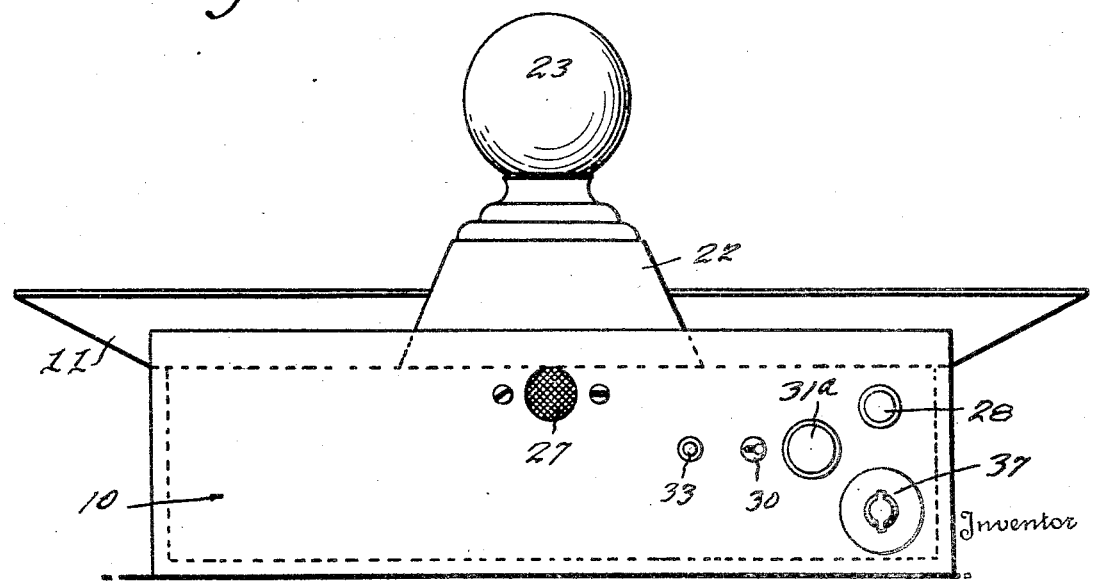
Figure 3:
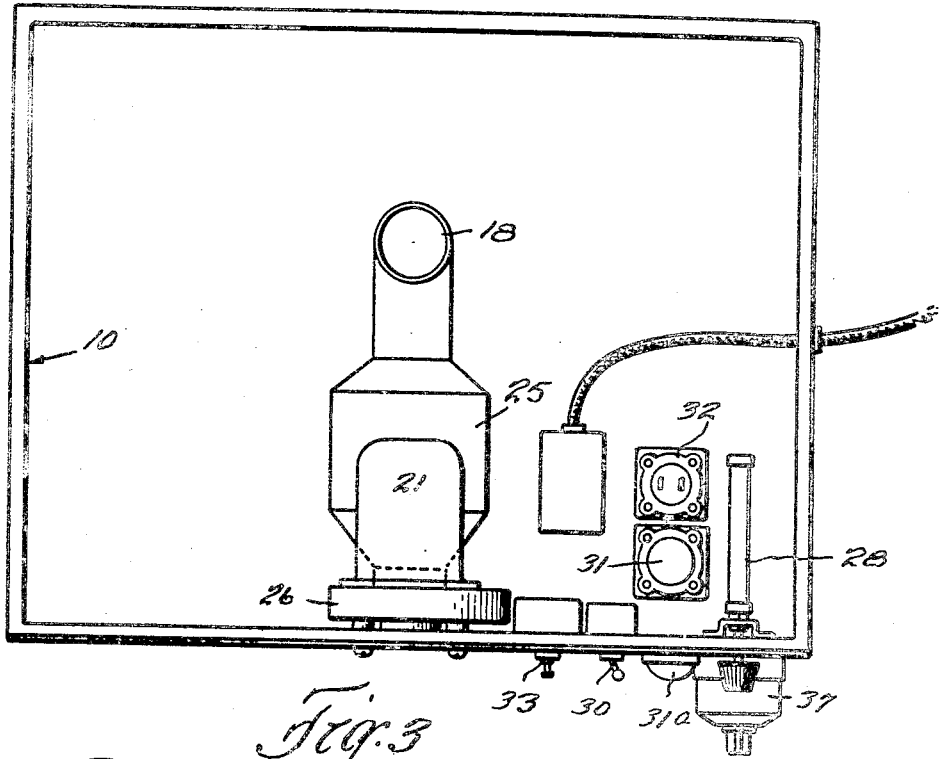
Figure 4:
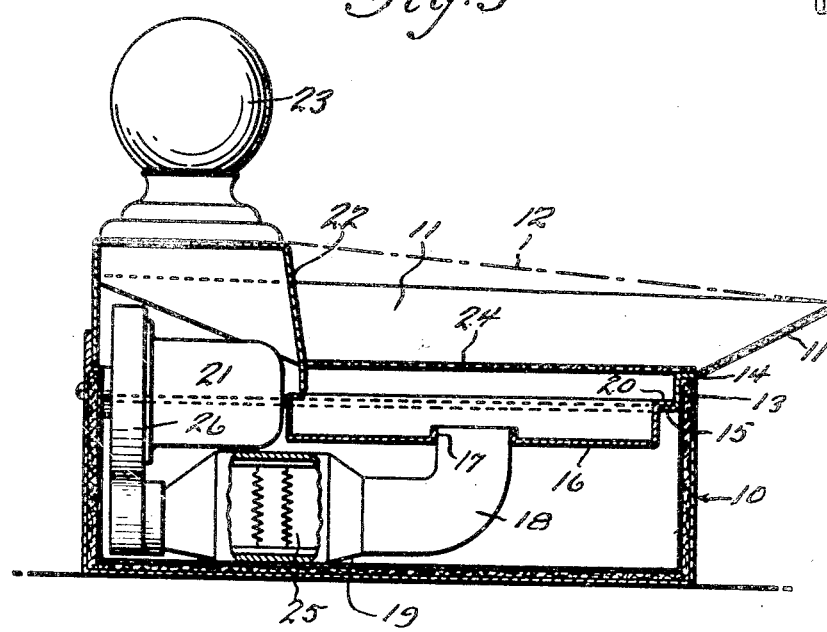
Figure 10:
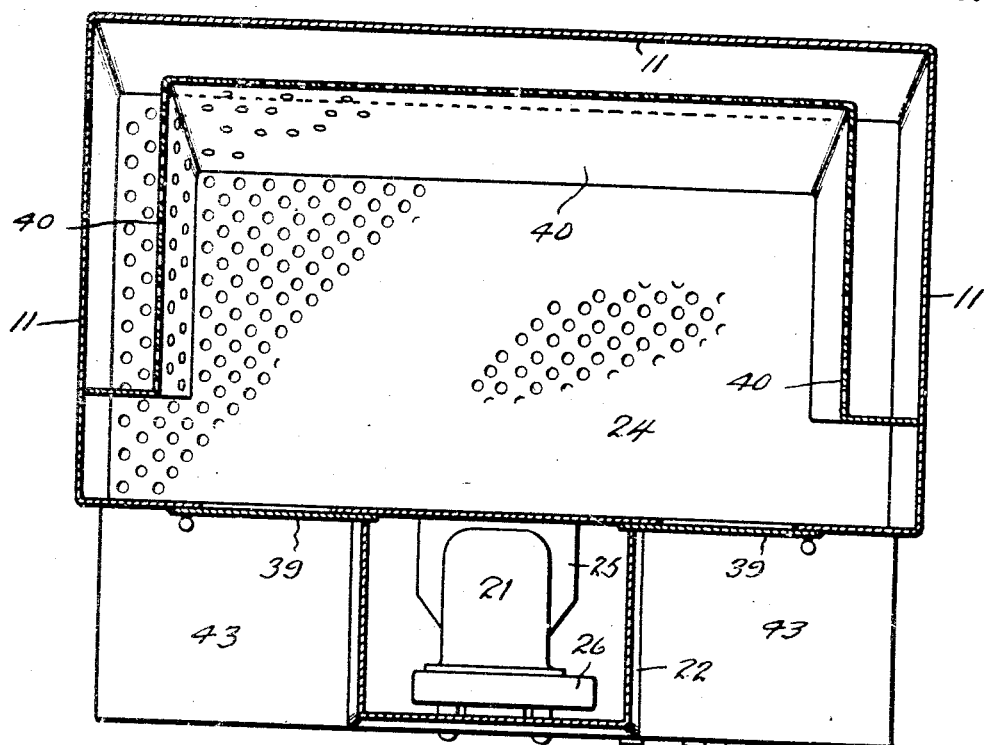
Figure 7:
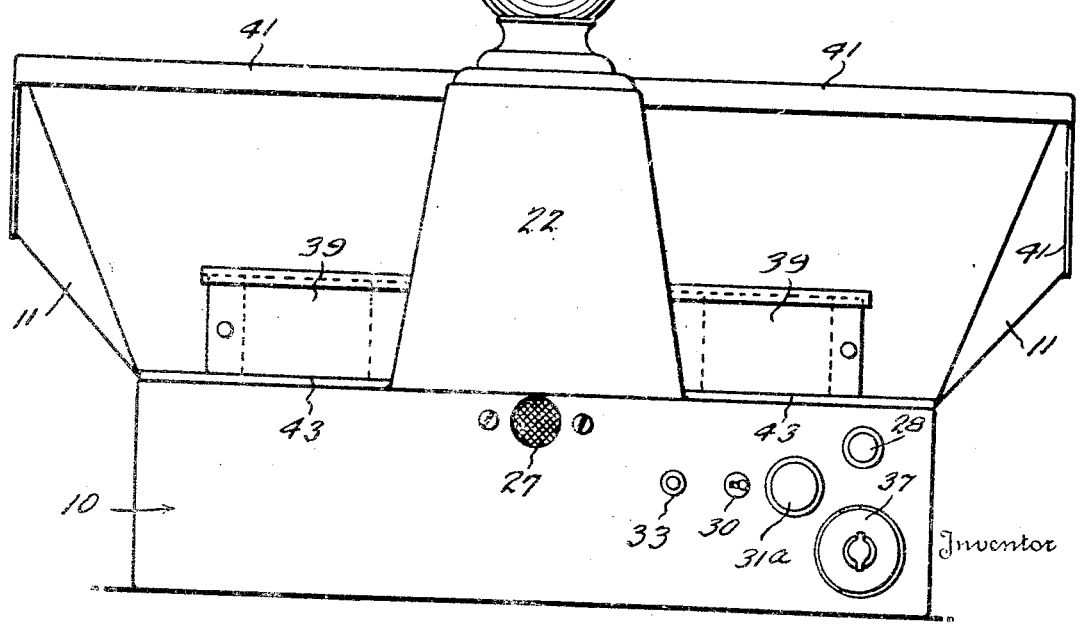

Fig. 1 is an elevation of one embodiment of my invention; Fig. 2 is a plan view thereof; Fig. 3 is a plan view of the lower portion of the device with the hopper removed; Fig. 4 is a section on the line 4—4 of Fig. 2; Fig. 5 is a section taken at right angles to the plane of Fig. 4; Fig. 6 is a wiring diagram showing the electrical connections; Fig. 7 is an elevation of a modified form; Fig. 8 is a vertical section taken to one side of the center of the embodiment of Fig. 7; Fig. 9 is a transverse section taken at right angles to the plane of Fig. 8 and Fig. 10 is a horizontal section corresponding to the line 10—10 of Fig. 8.

Referring now to the drawings it will be seen that the device consists of a base 10 upon which is supported, in both modifications, a hopper. In the modification in Fig. 1 the hopper 11 is represented as being open and divided by a perforated partition member 12 into two compartments. The base 10 consists essentially of an open topped receptacle-like member adapted to receive a downward projection 13 and to engage a shoulder 14 supporting said hopper. Inturned from the projection 13 is a flange 15 upon which is slidably supported an air inlet member 16, preferably of imperforate sheet metal. Centrally of the member 16 is an opening 17 which registers with the terminal portion 18 of a hot air conduit indicated generally by the numeral 19. The flange 15 extends around three sides of the hopper and engages an outturned flange 20 for support of the air inlet member 16. This member can only slide on the flange 15 when the hopper has been lifted clear of the base 10, being normally prevented from sliding motion by the motor 21 which is fixed with respect to the base 10. Formed in connection with the hopper is an upwardly extending support 22 for a light 23 which forms a continuation of the part 12 whereby to divide the entire hopper into two parts as well as providing for illumination. Resting on the shoulder 14 is a perforated false bottom 24 which is adapted to support the nuts.

Supported by the base 10 is the conduit 19 which includes an electrical heating element 25 and a pump 26 driven by the motor 21. Air enters the conduit 19 through the screened opening 27 under the influence of the pump 26 and passes the heating element 25 where its temperature is elevated and then enters the hot air inlet member 16 where it is distributed to all parts of the false bottom 24 and may pass therethrough under the pressure created by the pump 26. It will be noted that the partition 12 is of inverted V-shape and positioned immediately above the opening 17 through which heated air is discharged into the member 16. This provides for easy ingress of heated air into the interior of the partition 12 through the perforations of the false bottom and thereby provides for admitting heated air to the nuts through the perforations in the partition as well as through the bottom 24.

By reference to Fig. 6 it will be seen that the motor 21 is connected in series with a rheostat 28, a portion 29 of the heating element 25 and a suitable switch 30, while being connected in parallel with a pilot light 31 controlled by the same switch 30. The outlet 32 for the lamp 23 is connected in series with a suitable switch 33 and a plug 34 is provided for detachable connection of the lamp 23 thereby allowing the hopper to be removed simply by disconnecting the plug 34. The remainder of the heating element 25 is divided into two parts 35 and 36, the latter consisting of two elements similar to that 35 connected in series. A selector switch 37 is provided for connecting the portions 35 and 36 selectively or both together as will be obvious from Fig. 6.

The modification of Figs. 7 to 10 is identical with that of Fig. 1 with the exception of the hopper construction. Accordingly the same numerals are given to common portions and no further description thereof is necessary. The hopper of this modification is somewhat higher and provided with a cover 38 and a pair of doors 39 for withdrawal of the merchandise. Extending around three sides of the hopper is a perforated member 40 spaced therefrom a substantial distance at the bottom and converging thereto at the top. It will be seen by reference to Figs. 8 and 9 that the lower end of the member 40 extends a sufficient distance from the hopper wall to allow heated air to enter the space between the same and the hopper wall through the perforations in the false bottom plate 24. The inverted V-shaped partition 12 functions similarly but is supported from the frame 41 which supports the doors 38 as is indicated at 42. In this modification it will be clear that heated air can enter freely into the space between the hopper wall and the member 40 as well as into the interior of the partition 12 whereby the surface for ingress of heated air into the nuts will be greatly increased. The frame 41 which supports the covers 38 are T-shaped in cross section and the covers rest thereon loosely whereby the building up of a slight pressure within the hopper will result in a slight lifting to permit escape of heated air. From Figs. 8 and 10 it will be clear that the bottom wall of the hopper is continuous with a delivery platform 43 at each side whereby when the doors 39 are opened ready access may be had to the merchandise within the hopper.

From the foregoing it will be evident that I have provided a device of the character described which is well adapted for its intended purposes and while I have shown and described the preferred embodiment I wish it understood that I am not limited to the details thereof but only in accordance with the prior art and with the spirit and scope of the appended claims.

Having thus described my invention, what I claim is:

1. In a device of the class described, a hopper member having inturned flanges at the bottom, a pan-like member slidable on said flanges and provided with an inlet opening for hot air, a perforated false bottom above said pan-like member, means for supplying hot air to said inlet opening, and a perforated, inverted V-shaped partition extending upwardly from said false bottom.

2. In a device of the class described, a hopper member having inturned flanges at the bottom, a pan-like member slidable on said flanges and provided with an inlet opening for hot air, a perforated false bottom above said pan-like member, means for supplying hot air to said inlet opening, and a perforated, inverted V-shaped partition extending upwardly from said false bottom and being positioned directly above said inlet opening.

3. In a device of the class described, a hopper, a pan-like member detachably connected to the bottom thereof and substantially coextensive with said bottom, a hot air inlet formed in said pan-like member, a perforated false bottom for said hopper and covering said pan-like member, and perforated wall means defining a plurality of spaces communicating with said pan-like member through said false bottom, each said spaces narrowing toward the top of said hopper.

4. In a device of the class described, a hopper, a pan-like member detachably connected to the bottom thereof and substantially coextensive with said bottom, a hot air inlet formed in said pan-like member, a perforated false bottom for said hopper and covering said pan-like member, and perforated wall means defining a plurality of spaces communicating with said pan-like member through said false bottom, each said spaces narrowing toward the top of said hopper, an open top base supporting said hopper, air heating means in said base, a conduit containing said air heating means and communicating with said hot air inlet, and force feed means for forcing air through said conduit past said heating means and through said hopper.

WILLIAM W. KELLY.